April 5, 1932. G. R. MURPHY 1,852,212
COUPLING DEVICE
Filed Sept. 27, 1930

Inventor
George Ratcliffe Murphy
BY Shrove, Crown Gordon
Attys.

Patented Apr. 5, 1932

1,852,212

UNITED STATES PATENT OFFICE

GEORGE RATCLIFFE MURPHY, OF DULUTH, GEORGIA

COUPLING DEVICE

Application filed September 27, 1930. Serial No. 484,874.

Generically this invention relates to coupling devices, but it is more especially directed to the type adapted to couple a series of plows or like implements to a tractor.

An important object of this invention is the provision of a coupling device adapted for connection with the axle of a tractor and having means for connecting thereto a plurality of plows in suitable spaced relation.

A further object of this invention is the provision of a coupling device adapted for connection with the axle of a tractor and formed with a transverse longitudinal member and having means for detachably connecting a plurality of plows thereto and adjustable to regulate the spaced relation of said plows as desired.

A still further object of this invention is the provision of a coupling device of this character having means for detachably connecting a series of plows thereto and provided with rack means for transporting and maintaining said plows in inoperative position as desired.

Figure 1:
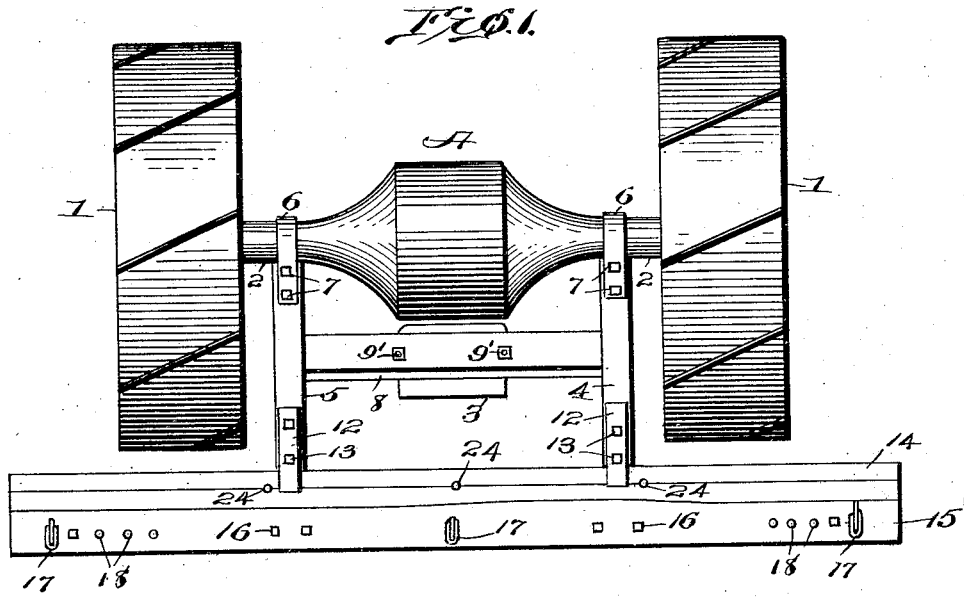
Figure 2:
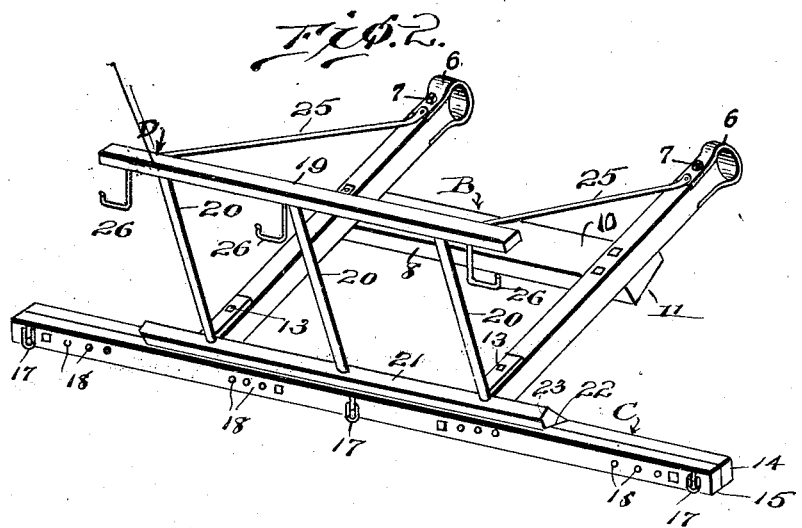

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a rear elevation of a tractor showing my improved coupling device connected thereto, and, Fig. 2 is a perspective view of the coupling device disconnected from the tractor, and showing the rack structure.

It has been found difficult to provide a gang coupling device manufacturable at a reasonable cost and yet efficient in operation, owing to the extreme load and tortional stresses to which it is subjected, and it was to overcome such deficiencies and to provide a coupling adapted for connection with the rear axle adjacent each tractor wheel, having a transverse brace intermediate its length, and terminating at its rear end in a cross beam extending beyond the opposite sides of the tractor, having means adjustable longitudinally of the beam for detachably connecting the respective plows thereto, and a rack supported above and rearwardly thereof provided with suitable hangers for holding in inoperative position each of the respective plows, that I designed the device forming the subject matter of this invention.

In the illustrated embodiment characterizing this invention there is shown a portion of a tractor A comprising traction wheels (1), rear axle (2) and lateral projection or tool box (3), of conventional design.

The coupling B comprises spaced parallel bars (4) and (5), respectively, and suitably mounted on one end of each of said bars is a U-shaped member (6) adapted to be mounted on axle (2) and secured to members (4) and (5) by bolts (7) or other suitable fastening means. The bars (4) and (5) are connected substantially centrally of their length by brace or cross bar (8) firmly secured to said bars by bolts (9) or other suitable fastening elements. Bar (8) is formed with an inclined upper surface (10) in order that the bottom flat surface (11) may properly seat on member (3) when supported thereby and secured by bolts or other fastening elements (9'), so that the bars (4) and (5) will be inclined downwardly from axle (2) for a purpose hereinafter more fully appearing.

Connected to the free ends of said arms (4) and (5) similar to members (6) are the substantially U-shaped strap members (12) adapted to embrace section (14) of cross beam C thereby firmly securing said section to said arms, the members (12) being secured thereto by bolts or other suitable fastening elements (13). Such arrangement with cross bar (8) forms a truss construction adapted to withstand heavy draw bar and lateral stresses, as will hereinafter more fully appear. In order to further strengthen the device, section (15) exactly corresponding in configuration to section (14) is secured thereto by bolts (16), whereby said sections are united to form the unitary member C.

A plurality of anchor or coupling elements 17 adapted to extend through member C are detachably secured by nuts or other suitable locking means, and are suitably spaced with respect to each other so as to properly position the respective plows or other implements connected thereto in spaced relation with respect to each other, and in order to vary the spaced relation of the plows, a series of spaced apertures (18) extend through member C adjacent each of said elements (17), whereby the latter may be adjusted longitudinally of said member C as desired. It is obvious that the elements (17) may be selectively positioned with respect to the openings (18) to vary the number of plows as well as their spaced relation with respect to each other.

The rack or plow holder D is supported by the coupling B and consists of a longitudinal bar (19) suitably secured on the upper ends of the spaced substantially upright rods (20), the lower ends of said rods adapted to extend through a complemental bar (21) having its lower surface (22) formed at an angle with respect to its upper surface (23) so that when seated on member C, the rods (20) will be positioned at an angle of approximately 45° with respect thereto, so that bar (19) will overhang or be positioned to the rear of member C as and for a purpose hereinafter more fully explained.

When the bar (21) is operatively positioned, the lower ends of rods (20) will extend therethrough and within countersunk apertures (24) formed in member C. The rack D is firmly secured by brace members (25), one end of said braces being suitably secured to bar (19) and the other ends secured to arms (4) and (5) by bolts (7). It will be clear that the rack mounted as above described tends to further strengthen the coupling device.

The rack D is of less length than member C and the member (19) has suitably secured to its undersurface a plurality of hook or hangers (26), the hook portions of which may extend in similar direction or some in one direction and some in another as desired. Each of these members are adapted to support a respective plow above the ground when the tractor is turning or for purposes of transporting said plows as desired.

From the above description the operation of the device would seem to be clear without further discussion, and likewise, it is apparent that I have designed a gang coupling device adapted for connection at spaced points with the axle of a tractor, and so constructed and supported thereby as to effect vertical adjustment of member C by raising and lowering member (8) with respect to member (3) by means of suitable spacers should same become necessary, and longitudinal adjustment of the plows with respect to member C by selectively placing the elements 17 in the desired apertures (18). It is further apparent that I have not only constructed a coupling device adapted to withstand heavy draw bar and lateral load stresses, but have also provided a coupling including a carrier for the respective plows, whereby they may be supported in inoperative position for purposes of turning and transportation as desired, yet one simple in construction, manufacturable at a negligible cost and efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A coupling device comprising a coupling bar means for connection with a tractor, a transverse member connected to said means adapted for connection with a plurality of plows, and rack means associated therewith for supporting said plows in inoperative position.

2. A coupling device for connection with a tractor comprising a transverse member, a plurality of coupling elements carried by said member for connecting a series of plows thereto, said coupling elements being longitudinally adjustable with respect to said member, whereby relative adjustment of the plows with respect to each other is effected, and rack means for supporting the plows in inoperative position.

3. A coupling device for tractors comprising spaced parallel coupling bars, a transverse member connected to one end of said bars, a plurality of plow coupling elements detachably carried by said transverse member, a rack member comprising upper and lower longitudinal bars connected by spaced rods, said rack member adapted to seat on said transverse member with said rods extending upwardly and rearwardly therefrom, a plurality of hook members carried by said upper bar, and brace members connecting said rack to said coupling bars, whereby a plurality of plows are operatively connected to said transverse member and adapted to be carried by said hooks when not in use.

This specification signed this 26 day of Sept., A. D. 1930.

GEORGE RATCLIFFE MURPHY.